United States Patent
Uhlik et al.

(10) Patent No.: US 7,369,841 B1
(45) Date of Patent: May 6, 2008

(54) WIRELESS NETWORK INFRASTRUCTURE

(75) Inventors: Christopher Uhlik, Danville, CA (US); Michael Youseffmir, Portola Valley, CA (US)

(73) Assignee: Durham Logistics LLC, Las Vegas, NV (US)

( * ) Notice: Subject to any disclaimer, the term of this patent is extended or adjusted under 35 U.S.C. 154(b) by 424 days.

(21) Appl. No.: 09/967,152

(22) Filed: Sep. 28, 2001

(51) Int. Cl.
*H04M 11/00* (2006.01)

(52) U.S. Cl. ............... 455/406; 455/408; 709/203; 709/225; 713/182; 713/183

(58) Field of Classification Search ......... 455/405, 455/406, 407, 408; 705/35, 39, 32, 40; 709/203, 709/225; 713/182–183
See application file for complete search history.

(56) References Cited

U.S. PATENT DOCUMENTS

| | | | |
|---|---|---|---|
| 5,893,903 A * | 4/1999 | Eisdorfer et al. | 705/1 |
| 6,553,022 B2 * | 4/2003 | Hartmaier | 370/352 |
| 6,640,097 B2 * | 10/2003 | Corrigan et al. | 455/414.1 |
| 6,680,923 B1 * | 1/2004 | Leon | 370/328 |
| 6,694,316 B1 * | 2/2004 | Langseth et al. | 707/10 |
| 6,754,833 B1 * | 6/2004 | Black et al. | 726/7 |
| 2002/0069244 A1 * | 6/2002 | Blair et al. | 709/203 |
| 2005/0044216 A1 * | 2/2005 | Zhang et al. | 709/224 |

* cited by examiner

*Primary Examiner*—Binh K. Tieu
(74) *Attorney, Agent, or Firm*—Stolowitz Ford Cowger LLP

(57) ABSTRACT

An access point of a network maintains information about data received at the access point from a server accessible via the network and provides to the server the information maintained at the access point. The access point then receives from the server a payment for an account associated with an operator of the access point.

46 Claims, 1 Drawing Sheet

WIRELESS NETWORK INFRASTRUCTURE

TECHNICAL FIELD

This invention generally relates to wireless communication systems and, more particularly, to a business model for expanding a wireless network architecture.

BACKGROUND

Wireless Internet services are available today, utilizing, for example, standard wireless protocols such as Cellular Digital Packet Data, also known as "wireless Internet Protocol" (wireless IP). (See CPDP System Specification and Implementation Guidelines, Release 1.1, Wireless Data Forum, Washington, D.C.) CDPD can be implemented in American Mobile Phone Systems (AMPS) cellular networks, and thus a wireless Internet service based thereon could become available, but the service is slow (given a data transmission rate of 19.2 kbps) and expensive (approximately $1.40 per megabyte of data transmitted). (The AMPS is a frequency division multiple access (FDMA) analog cellular system developed by AT&T Bell Labs in the 1970s).

Additionally, wireless local area networks (WLANs), for example, those based on the IEEE 802.11 standard, are emerging. (For further information regarding the IEEE 802.11 standard, refer to IEEE 802.11, 1999 Edition (*ISO/IEC 8802-11: 1999*) *IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications;* IEEE 802.11a-1999: 8802-11:1999/*Amd* 1:2000 (*E*)), *IEEE Standard for Information technology—Telecommunications and information exchange between systems—Local and metropolitan area networks—Specific requirements—Part 11: Wireless LAN Medium Access Control (MAC) and Physical Layer (PHY)*>specifications—Amendment 1: *High-speed Physical Layer in the 5 GHz band;* and *IEEE* 802.11b-1999: *Supplement to* 802.11-1999, *Wireless LAN MAC and PHY specifications: Higher speed Physical Layer (PHY) extension in the* 2.4 GHz band.)

Increasingly popular 802.11b WLANs currently offer ~6 Mbps (11 Mbps instantaneous peak) data transmission rates over a range of ~100 meters and soon will increase to ~30 Mbps. Besides the relatively high speeds achieved by IEEE 802.11 based WLANs, such WLANs generally have no service fees. However, because of this, there is no incentive for operators to install IEEE 802.11 networks for public use. Thus coverage is limited to private networks.

In summary, the wireless Internet service available today is an expensive, fragmented service with limited coverage. To obtain reasonable data transmission rates and service coverage, one could maintain a CDPD subscriber account, and carry a CDPD PCMCIA modem card, and an 802.11 WLAN PCMCIA card. A home or office computer would utilize the 802.11 WLAN PCMCIA card, and the CPDP PCMCIA card for general use outside the home or office.

Network operators have not embraced development of a wireless infrastructure because of the perceived need to acquire sufficient licensed radio frequency spectrum to build out a nation-wide network, a costly undertaking. With the uncertainties raised by the introduction of other technologies such as GPRS/EDGE and CDMA-2000, and the recent history of the wireless market, these operators are proceeding slowly and cautiously.

What is needed is a business model, network architecture and protocols that facilitate development and operation of a wireless infrastructure to provide ubiquitous wireless Internet access.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION

Figure 1:
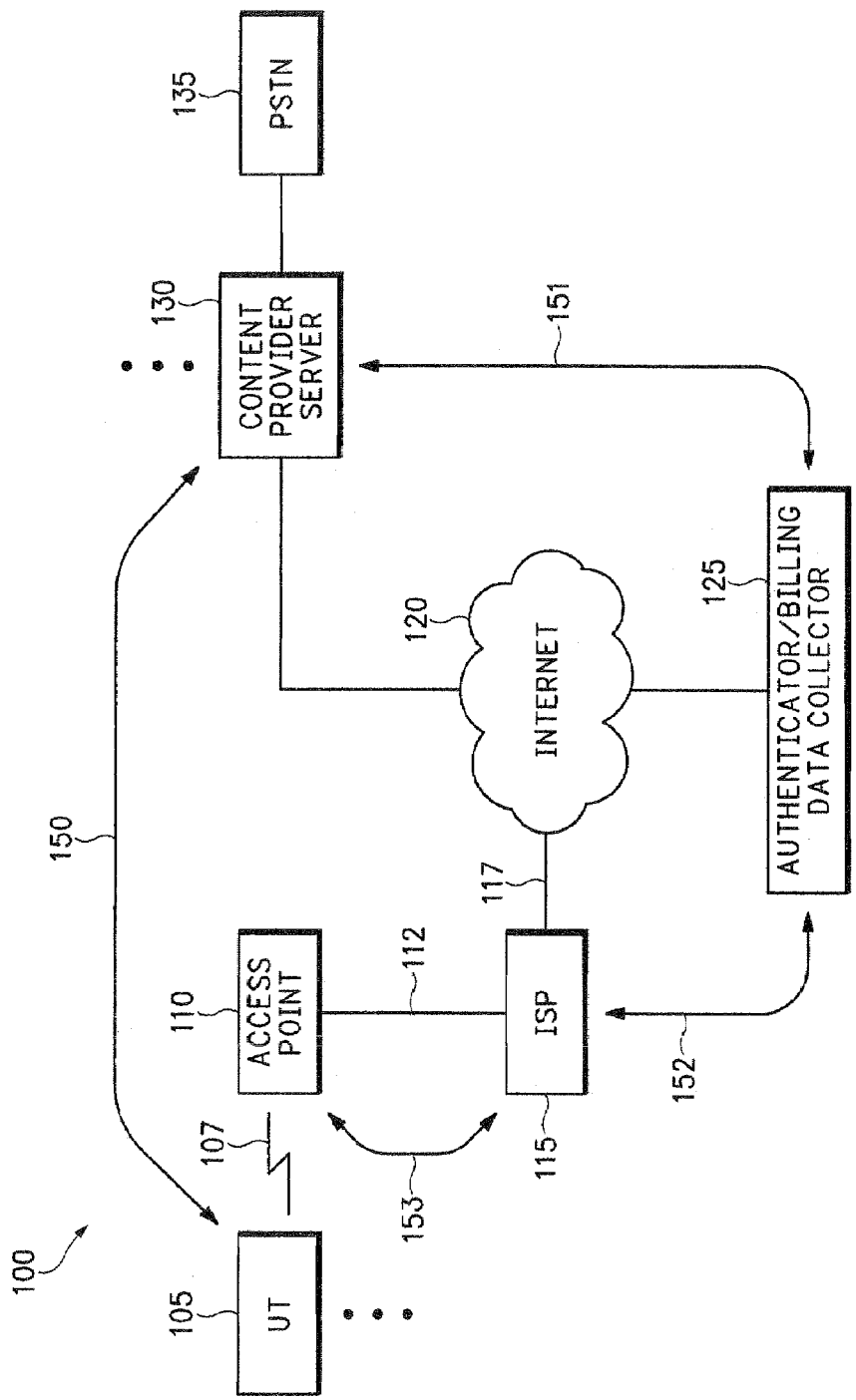
FIG. 1 illustrates an embodiment of the invention.

Reference throughout this specification to "one embodiment" or "an embodiment" means that a particular feature, structure of characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

A business model, network architecture and software are described for implementing and operating a world-wide wireless internetwork infrastructure. The infrastructure includes a distributed wireless packet data network based on wireless local area networking (WLAN) technology and utilizing high speed (e.g., 1-11 megabits per second data rates), low cost wireless data terminal equipment (e.g., less than $100). However, it is appreciated that wireless technology and data terminal equipment are not sufficient incentives, on their own, to build a wireless network—also needed are the economic incentives to invest in building a comprehensive network necessary to support a wide variety of wireless network services.

The invention described herein aligns the interests of wireless base station operators, Internet service providers (ISPs), and content providers, and provides a means by which money flows from end users to content providers and then back to the ISPs and wireless base-station operators, thus providing an incentive to expand the wireless network infrastructure. In this manner, it is expected that, for example, thousands of entities become independent wireless base station operators. It is contemplated that some entities, such as individuals, will become base station operators for a cut of the subscriber revenue stream. Other entities, such as hotels and restaurants, will do so because their regular customers see wireless Internet coverage as a value added service. Still others will set up and operate base stations in their homes and offices simply for personal use. As a side effect of all of these interests, a wireless network infrastructure will expand to cover areas in which end users want to, and can, use their UTs.

The invention provides an environment for content providers to develop wireless services for end users while returning a fraction of the content providers revenues, for example, to the network, for distribution back to the Internet Service Providers (ISPs), and/or the radio base-station operators. It is contemplated that every entity is capable of being independent of the others, from the wireless radio base-station operators, the ISPs, to the content providers.

FIG. 1 illustrates one embodiment of the invention 100, in which independent radio base-station operators build ubiquitous wireless Internet coverage based on monetary incentives. Prior art approaches to providing such coverage suffer from scaling problems that limit the rate of growth and adoption—it is a huge task for a single or small number of entities to build and operate a complete network, market user terminals, bill subscribers, acquire radio frequency spectrum, etc. The invention differs from such other models, e.g., Metricom's now defunct Ricochet wireless Internet approach, mainly by distributing reasonability for base-station acquisition, sitting, and operation to independent base-station operators in exchange for some portion of end user or subscriber revenues.

A user terminal (UT) 105 communicates with a server, for example, a server 130 connected to the Internet 120 and operated by a content service provider, such as Amazon.com. The term user terminal, as used herein, refers to a user device or user equipment. Additionally, a user is a device or application attached to or coupled with the UT, and an end user or subscriber is a person or entity owning or using the user/UT. The subscriber periodically pays for Internet based services, such as Voice over Internet Protocol (Voice over IP, or VoIP) phone calls, book purchases, stock quotes, etc., as represented by arc 150 in FIG. 1. A portion of these payments are distributed by the network infrastructure to the providers of the various network data carrying services actually used (denoted by arcs 151 and 152), including the operator of a wireless base station (denoted by arc 153).

The UT may be any electronic device having wireless radio frequency communication capabilities, or coupled to or with a device having radio frequency communication capabilities, such as a wireless modem. Additionally, software, such as drive software, may be resident in the UT so the UT can operate in a network in accordance with the present invention.

For example, the UT may be a desktop or laptop computer, a personal digital assistant (PDA), cellular telephone, two-way pager, or the like. In one embodiment, UT 105 contains a radio that transmits and receives Internet Protocol (IP) datagrams or packets to and from the Internet 120. The radio can be a PCMCIA card-based wireless modem. The UT communicates with server 130 via a wireless radio frequency link 107.

A wireless access point 110, or simply, access point 110, is a wireless base-station that collects packets from and distributes packets to user terminals in its wireless coverage area. The access point typically is coupled via a link 112 to ISP 115, which in turn, connects to the Internet 120 via link 117. Ideally link 112 is fast and inexpensive (e.g. cable modem, xDSL line, wireless point-to-multipoint, etc.) but it could also be a simple dial-up connection, depending on the base station hardware and software, base station location, and amount of traffic transmitted via the base station. A person or business may be the owner and/or operator of one or more such access points.

The access point 110 can be an IEEE 802.11 base station, capable of communicating with user terminals via the radio frequency link 107 using a wireless protocol such as IEEE 802.11. While FIG. 1 illustrates a single UT and a single access point or wireless radio base station, it is appreciated that many base stations and many more UTs are utilized, indeed, desired, to support, for example, a nationwide wireless network infrastructure.

In one embodiment, the access point, in addition to providing wireless service coverage for UTs in its service area, collects billing information, for example, based on data traffic processed by the access point. The access point collects traffic data, that is, statistical data about the data traffic, necessary for billing. The access point operator receives payments, as represented by arc 153, for providing wireless Internet services. The payments can be calculated, at least in part, based on the billing information collected by the access point. The access point furthermore may collect billing information on a per UT basis, so that depending on the type of subscriber account associated with the user of the user terminal, the subscriber can be billed, that is, an accounting for services is posted to the subscriber account, and the access point can receive a portion of a payment by the subscriber for the bill, based on the posting. For example, for flat rate service (e.g., a subscriber pays $20/month), the access point need only count bytes, or number of packets, of traffic carried, while for measured rate service (e.g., a subscriber pays $15/month plus $0.10 per megabyte (MB) over 50 MB per month and $0.05 per MB over 200 MB per month), a byte count per UT (as identified, for example, by the UT's MAC address) is maintained. Alternatively, service could be measured in terms of connect time, for example, per-minutes or per-day connect-time. Connect time may be the amount of time the user terminal is associated with a WAP, or the amount of time the user maintains a session with a server via a connection to the server established via the WAP.

The access point includes software that routes IP packets, collects billing information, and cooperates with the other network entities to deliver network services. Alternatively, such software may reside in the ISP 115. Given the ISP's possible hardware platforms likely are more varied than the access point's possible hardware platforms, it may be, from a developer's perspective, better to develop router software for access points rather than ISP hardware platforms. Ultimately, it is contemplated that this software will be capable of being executed on many access point platforms. However, initially it is contemplated to run on a Microsoft Windows98/Windows2000/WindowsNT PC with a wireless LAN base station coupled thereto.

The router software performs many functions, including requesting authentication of WLAN MAC addresses as new user terminals request admission to the network; keeping track of local, private user terminals which may be allowed to use the network free of charge; filtering unauthorized traffic; providing fire-walls services so that public user terminals cannot send and receive packets to machines on a private LAN; coordinating hand-over of a roaming user terminal with other access points; tunneling (encapsulating) traffic to other access points after a roaming user terminal subscribing to full or partial mobility service has moved on to another access point; unwrapping (decapsulating) traffic tunneled to the user terminal's present access point form the user terminal's original access point; and collecting billing traffic summary statistics (for example, by user terminal) and storing them for upload to the billing entity.

In one embodiment of the invention, access point concentration is provided by a conventional wired Internet Service Provider (ISP) 115. That is, multiple access points access the Internet via the same ISP. In particular, each access point 115 is connected to the Internet 120, usually by the back-haul services provided by the ISP. The ISP usually has a high-speed trunk connection 117 to the Internet 120. The high-speed trunk is often a T1, T3, or ATM connection.

Responsibility for customer billing and marketing may or may not be distributed among Internet-based content and service providers, many of whom provide specialized services with specialized terminal equipment (e.g., a VoIP phone). To the extent billing is distributed between various service providers, the revenue/value chain is more complicated, but in any case, investment is further distributed and the potential for wireless network infrastructure growth is expanded in accordance with the present invention.

An authenticator 125 is connected to the Internet 120 and provides authentication services to access points and user terminals. The authenticator 125 charges a fee to content service providers, such as the content service provider operating server 130, for allowing subscribers access to the network 100. The fee provided the authenticator, represented by arc 151, is some portion of subscriber payments to content service provider 130 for providing, among other things, authentication services for the content service provider and the provider's subscribers. Router software, whether executing on the hardware platform of the access point or ISP, queries the authenticator as to whether to provide packet delivery services for a given user. The authenticator, using encryption software, communicates with a user terminal, in particular, software such as driver software, on the user terminal, to authenticate the user. In one embodiment, the authenticator also queries the content service provider to verify the subscriber has adequate credit standing to gain access to the network.

Upon receiving a response from the authenticator, router software decides whether to continue to provide packet routing and delivery services for a particular user terminal. If authentication fails, then service for the user terminal is unavailable. In one embodiment, the authenticator also provides a code to the router software for use in generating encrypted billing information for that user terminal. The authenticator collects traffic data statements from router software, via the ISP back haul line 117, and stores the statements for use in calculating usage-based payments back to ISPs and access point operators, respectively represented in FIG. 1 by arcs 152 and 153. In one embodiment, if the authenticator and billing entity functionality is distributed among different platforms and/or service providers, the anthenticator further uploads the collected billing traffice statistics to the billing entity hardware/service provider. In one embodiment, communication between the access point and the authenticator is encrypted to prohibit impersonation of the authenticator and/or access point.

The content service provider operating, for example, server 130, provides Internet content for which a subscriber is willing to pay money, for example, a subscription fee. In the case of a subscription fee based service, the content service provider collects periodic payments from subscribers and pays the network access bills generated by the authenticator. The authenticator then distributes some portion of these revenues, referred to herein as a rebate, back to ISPs and/or access point operators based on the services they provided (e.g., number of bytes transmitted). In some content service provider models, no value-added content is served—the subscriber simply gets an Internet connection in a fee-for-bytes or flat-rate arrangement similar to a conventional, wired ISP.

The rebates can be tired based on how much an operator pays for a base-station. Subsidized base-stations might carry a smaller rebate than ones sold without subsidy. In fact, overpayment for base-stations is possible to provide a means for an operator to invert in the billing entity service provider.

Although not shown in FIG. 1, a Home Location Register (HLR) may optionally be utilized in the network 100. The HLR comprises an Internet resident database of user terminal locations. Router software or driver software updates records in the HLR as mobile user terminals move about from WLAN to WLAN, that is, from one access point to another access point, or from one ISP to another ISP. In one embodiment of the invention, the content service provider may provide the HLR.

In conjunction with the optional HLR, an optional mobility service is available to a user terminal. The service provides a fixed IP address for a mobile user terminal. A mobility service provider can keep track of the whereabouts of a user terminal, with reference to the HLR. The actual implementation of mobility services depends on the underlying service. Mobility services provided by a single server can simply follow the user terminal around as the IP address assigned to the user terminal changes.

An important underlying principle of the wireless network architecture and business model contemplated by the present invention is that all entities participating in the set up and operation of the network should have something to gain from expanding and improving the network and its services. For example, content service providers such as Amazon, Yahoo, Quest, Level3, etc., get customers that the content providers can target with merchandise, wireless devices, and services of all kinds. A music company can sell songs for a wireless MP3 portable music database/player. An Internet VoIP phone company can sell voice communications services. An online bookstore can sell books that a subscriber downloads and reads on a portable electronic device. Online magazines can sell access to their services. A medical monitoring company can sell real-time analysis of heart rhythms, possibly detecting a heart attack before it happens. The potential applications are numerous.

Ubiquitous, high-speed, wireless Internet service opens new opportunities for providing content and services. The application content service providers increase revenue from a growing user base. Users subscribe because of all the available content. Furthermore, the application content service providers market wireless devices and services that build the user base fueling demand for the network.

Subscribers get access to a wide range of goods and services made possible by high speed, ubiquitous wireless Internet service coverage. A subscriber gets "tetherless Internet access" near any access point. The number of installed access points increases until wireless Internet service coverage becomes ubiquitous. As WLAN technologies improve, data rates increase. However, the subscriber need not wait for a full network deployment to perceive significant value. The subscriber can purchase a personal access point and have tetherless Internet access in their home or office, which is the key to getting the wireless network infrastructure in place.

A mentioned above, Internet Service Providers (ISPs) provide back-haul services from wireless access points to the Internet. A rebate scheme is structured such that the ISPs are paid for the data traffic that they transport between the Internet and access points, however calculated. Thus, it is in the interest of ISPs to encourage the installation of more and more access points providing coverage and increasing wireless Internet usage.

In one embodiment, ISPs also provide fixed IP addresses and mobility management services for users who wish to maintain a continuous Internet connection while roaming between WLANs. For services that require these continuous connections, (e.g., VoIP services) context service providers may contract with ISPs to provide fixed virtual connections to mobile users. This fixed IP address and mobility management service performs the same function as an HLR in a cellular telephone network, which are well known in the art, and thus not discussed further herein.

It is contemplated that some access point operators will install base stations just to get wireless Internet service coverage where needed for their own use as subscribers. A typical example of this scenario would be a home user who buys an access point to get coverage in their home. Backhaul services would be provided through a cable modem, xDLS line, or even dial-up modem. Depending on the range of the WLAN technology embodied in the base station, the home user might incidentally be providing service to their neighbors, for example, in apartment buildings. Another example is business that install base stations to provide tetherless Internet access within their facility. Security features in the access point router software would provide different routing services for company employees versus "foreign" users. For example, employees may be allowed to mount directories on a local file server, but foreign users would not see any local servers.

However important these incidental access point operators are to providing ubiquitous wireless Internet service coverage, the rebate scheme is structured to ensure an incentive to become an access point operator. Airports, hotels, coffee shops, libraries, bookstores, shopping malls, etc., will install access points for the revenue generated by rebate payments. This financial feedback is what drives operators to provide service at locations desired by users and to split wireless service areas to provide adequate capacity.

Eventually, it is envisioned that the subscriber base might be large enough that establishments such as coffee shops, bookstores, and hotels provide coverage on their premises as a service to their customers simply to maintain competitiveness in drawing customers.

The clearest incentive is to the authenticity/billing entity, which is the primary collector of the subscriber generated revenue stream, with a portion of this revenue provided to access point operators and ISPs as a rebate. The authenticator, or authentication service provider, maintains the keys to access network 100. No user terminal can access a foreign WLAN without permission from the authenticator. The authenticator also collects billing information (for example, VoIP telephone call detail records) from the ISPs for each user terminal session. This billing data is provided to content service providers for use in billing the user. The content service provider pays the authenticator to keep subscribers in the authenticator's database, thereby ensuring continued access to the network 100.

Manufacturers are presented with the opportunity to sell base stations and user terminals. Access points are not sold to a small group of large operators—instead, access points are high volume consumer electronics devices. Likewise, user terminals need not be tie to specific service providers. They can be sold directly to consumers and retailers.

Any number of content service providers can utilize network 100 and the business model described above to provide applications to subscribers. A brief description of some possible content service follows.

The simplest service is a general Internet Protocol (IP) packet delivery service. The UT in this case may be a WLAN card in a laptop PC. The services provided to the subscriber include various Internet application protocols, including HTTP (world wide web browsing), telnet, FTP, etc. The content service provider has no infrastructure other than billing, takes call detail information from the Authenticator, debits the subscriber's billing account, and sends an account statement, for example, via electronic mail, to the subscriber. The bulk of the subscription fee is transferred (as designated by arc 151 in FIG. 1) to the authenticator and then distributed to the ISPs (arc 152) and access point operators (arc 153). A typical subscription fee schedule might be:

0 to 20 MB/month@$19.99/month, plus $1 /MB for >20 MB/month

Of this, for example, 80 percent is transferred to the authenticator, and then 80 percent of that is transferred to the ISPs.

Low mobility cellular telephone service, similar to Personal Handyphone System (PHS) in Japan, can be readily provided by VoIP-enabled WLAN user terminals that have the appearance of cell phones. These user terminals cooperate with application software resident either at their homes ISP or at the customer service provider's servers. This software coordinated the delivery of compressed voice packets between the user's terminal and a public switched telephone network (PSTN) gateway nearest the termination point of the phone call. The authenticator charges the content service provider per MB of voice traffic sent from and received by the user's user terminal (i.e. phone). The content service provider bills the user, for example, based on this usage data or, for example, based on more detailed information about call sources and destinations.

An additional application contemplated by the invention is an electronic book service that comes with an electronic book reader device with storage for several books and a display. Using the book reader device, a subscriber can visit an electronic book reader service web site, browse book content, select for purchase and purchase book content, and download book content for reading when out of wireless range (e.g., on an airplane, in a car) or even have a printed copy delivered to your house. The book reader service provider and the original author are secure in the knowledge that the downloaded book cannot be copied and further distributed without physically breaching the electronic book device.

An MP3 service would operate in a manner very similar to the electronic book service, but the information content is music rather than prose. The user terminal would have real-time access to the libraries of music content. Control of the physical user terminal device and protocols allows the content service provider to be secure in the knowledge that the music downloaded will not be illegibly redistributed.

One example of an implementation of an embodiment of the invention follows. A subscriber accesses an online bank via a user terminal, UT1, and purchase credit for 1000 units of Internet access for some amount of money, say $10. The units may represent any measure of Internet access, for example, bandwidth, time, quality of service, or some combination thereof. The online bank mints a certificate, N1, for the subscriber by generating a 512 bit random number, storing it in the subscriber's database record at the online bank along with an identifier for UT1, UT1_ID, and the number of units purchased, in this example, 1000 units. (The random number that is the certificate is a representation of the units purchased by the subscriber). The random number is then encrypted and sent to the subscriber.

At some point the subscriber then accesses the Internet. An access point, AP1, receives a page from the UT1, and as part of the process of setting up a session, queries the subscriber for a deposit against future data traffic with UT1. The subscriber responds by sending the certificate to the online bank with a request that some number of units, say 2 units, be reallocated to AP1.

The onlink bank receives the certificate N1 from the request and verifies that UT1 indeed owns 1000 units, mints a new certificate, N2, representing 998 units for UT1, and another certificate, N3, representing 2 units for AP1, and provides the certificates to UT1 and AP1, according to the same process as described above. After both UT1 and AP1 acknowledge receiving their change (998 units) and payment (2 units), respectively, certificate N1 is removed from the subscriber's database, and certificate N2 is added in its place. The certificate N3 is added to the access point's database record maintained at the online bank as well. Alternatively, the certificate N3 is not needed; 2 credits are simply added to AP1's account balance at the online bank. At the end of a billing cycle, e.g., the end of the month, access points receive a check for their credit balance.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method comprising:
    collecting statistical data for a plurality of user terminals at an access point of a network,
    wherein the plurality of user terminals are capable of accessing the network by use of the access point, and
    wherein the statistical data comprises information about data traffic provided from a server accessible to the plurality of user terminals;
    providing to a billing entity the statistical data;
    determining a payment associated with an account associated with an operator of the access point at the billing entity,
    wherein the determining is based, at least in part, on the provided statistical data.

2. The method of claim 1, further comprising operating the access point with a network service provider.

3. The method of claim 1, wherein the access point comprises a wireless access point (WAP).

4. The method of claim 3, wherein determining the payment associated with the operator of the access point comprises determining a payment for an account associated with an operator of the WAP.

5. The method of claim 3, wherein the WAP comprises a base station.

6. The method of claim 5, wherein determining the payment associated with the operator of the access point comprises determining a payment for an account associated with an operator of the base station.

7. The method of claim 5, wherein the base station comprises a substantially IEEE standard 802.11 compliant base station.

8. The method of claim 1, wherein the network comprises a wireless local area network (WLAN).

9. The method of claim 1, wherein the network comprises an internetwork.

10. The method of claim 9, wherein the internetwork comprises the Internet.

11. The method of claim 1, further comprising providing, as at least part of the statistical data, information about data packets received at the access point from the server and forwarded by the access point to at least one wireless one of the user terminals.

12. The method of claim 11, wherein the at least one wireless user terminal comprises one or more of a cellular telephone, a mobile telephone, a voice over internet protocol mobile telephone, a laptop computer, a wireless modulator/demodulator coupled to an electronic computing device, a personal digital assistant, and a two way pager.

13. The method of claim 11, further comprising operating the server with a content service provider.

14. The method of claim 11, further comprising providing, as at least part of the statistical data, a count of bytes of data received at the access point from the server and forwarded by the access point to the at least one wireless user terminal.

15. The method of claim 11, further comprising providing, as at least part of the statistical data, a count of bytes of data received at the access point from the server and forwarded by the access point using a Media Access Control address associated with the at least one wireless user terminal.

16. The method of claim 1, further comprising providing, as at least part of the statistical data, a count of bytes of data received at the access point from the server to the plurality of user terminals.

17. The method of claim 1, further comprising:
    determining the payment associated with the account associated with the operator of the access point responsive to an amount paid for the access point.

18. The method of claim 1, further comprising:
    determining the payment associated with the account associated with the operator of the access point responsive to a subsidy provided for the access point.

19. The method of claim 1, further comprising:
    operating the server by a content service provider;
    determining the payment associated with the account associated with the operator of the access point responsive to a portion of subscriber payments to the content service provider; and
    wherein the subscribers access the content service provider via the plurality of user terminals.

20. The method of claim 1, wherein the determining the payment associated with the account associated with the operator of the access point includes:
    operating the network with an internet service provider; and
    determining a payment for the internet service provider responsive to the statistical data.

21. The method of claim 20, further comprising:
    determining, responsive to the statistical data, a portion of the payment for the internet service provider as the payment associated with the account associated with the operator of the access point.

22. The method of claim 1, further comprising:
    operating the server by a counter service provider;
    authenticating accesses of the user terminals to the network by an authenticator;
    determining a payment from the content service provider to the authenticator for the authenticating; and
    wherein the determining the payment associated with the account associated with the operator of the access point includes determining, in response to the statistical data, a portion of the payment from the content service provider to the authenticator for the operator of the access point.

23. A system, comprising:
a network access point capable of collecting statistical data for a plurality of user terminals,
wherein the plurality of user terminals are capable of accessing the network by use of the access point, and
wherein the statistical data comprises information about data traffic provided from a server to the plurality of user terminals;
a billing entity capable of determining a payment associated with an account associated with an operator of the access point responsive at least in part on the statistical data.

24. The system of claim 23, wherein the network access point is operated by a network service provider.

25. The system of claim 23, wherein the network access point comprises a wireless access point (WAP).

26. The system of claim 25, wherein the billing entity is configured to determine a payment for an account associated with an operator of the WAP.

27. The system of claim 25, wherein the WAP further comprises a base station.

28. The system of claim 27, wherein the billing entity is configured to determine a payment for an account associated with an operator of the base station.

29. The system of claim 27, wherein the base station comprises a substantially IEEE standard 802.11 compliant base station.

30. The system of claim 23, wherein the network comprises a wireless local area network (WLAN).

31. The system of claim 23, wherein the network comprises an internetwork.

32. The system of claim 23, wherein the information about data traffic provided from the server to the plurality of user terminals comprises information about data packets received at the access point from the server and forwarded by the access point to at least one wireless one of the user terminals.

33. The method of claim 32, wherein the information about data packets received at the access point from the server and forwarded by the access point to the at least one wireless user terminal comprises a count of bytes of data received at the access point from the server and forwarded by the access point to the at least one wireless user terminal.

34. The method of claim 33, wherein the count of bytes of data received at the access point from the server and forwarded by the access point to the at least one wireless user terminal comprises a count of bytes of data received at the access point from the server and forwarded by the access point using a Media Access Control address associated with the at least one wireless user terminal.

35. The system of claim 23, wherein the information about data traffic provided from the server to the plurality of user terminals comprises a count of bytes of data received at the access point from the server.

36. An article comprising: a storage medium having stored thereon instructions that if executed by a computing device performs a method as follows:
collecting statistical data for a plurality of user terminals at an access point of a network;
wherein the plurality of user terminals are capable of accessing the network by use of the access point; and
wherein the statistical data comprises information about data traffic provided from a server to the plurality of user terminals;
providing to a billing entity the statistical data;
determining a payment associated with an account associated with an operator of the access point at the billing entity,
wherein the determining is based, at least in part, on the provided statistical data.

37. The article of claim 36, wherein the access point is operated by a network service provider.

38. The article of claim 36, wherein the access point further comprises a wireless access point (WAP).

39. The article of claim 38, wherein the WAP comprises a base station.

40. The article of claim 39, wherein the instructions, if further executed, determine a payment for an account associated with an operator of the base station.

41. The article of claim 39, wherein the base station comprises a substantially IEEE standard 802.11 compliant base station.

42. The article of claim 36, wherein the network comprises a wireless local area network (WLAN).

43. The article of claim 36, wherein the information about data traffic provided from the server to the plurality of user terminals comprises information about data packets received at the access point from the server and forwarded by the access point to at least one wireless one of the user terminals.

44. The article of claim 43, wherein the information about data packets received at the access point from a server and forwarded by the access point to the at least one wireless user terminal comprises a count of bytes of data received at the access point from the server and forwarded by the access point to the at least one wireless user terminal.

45. The article of claim 44, wherein the count of bytes of data received at the access point from the server and forwarded by the access point to the at least one wireless user terminal comprises a count of bytes of data received at the access point from the server and forwarded by the access point using a Media Access Control address associated with the at least one wireless user terminal.

46. The article of claim 36, wherein the information about data traffic provided from the server to the plurality of user terminals comprises a count of bytes of data received at the access point from the server.

* * * * *

UNITED STATES PATENT AND TRADEMARK OFFICE
CERTIFICATE OF CORRECTION

| | | |
|---|---|---|
| PATENT NO. | : 7,369,841 B1 | Page 1 of 1 |
| APPLICATION NO. | : 09/967152 | |
| DATED | : May 6, 2008 | |
| INVENTOR(S) | : Uhlik et al. | |

It is certified that error appears in the above-identified patent and that said Letters Patent is hereby corrected as shown below:

At column 10, line 60, please replace "counter service provider" with --content service provider--.
At column 12, line 39, please replace "from a server" with --from the server--.

Signed and Sealed this

Eighth Day of June, 2010

David J. Kappos
*Director of the United States Patent and Trademark Office*